(12) United States Patent
Alakarhu (10) Patent No.: US 9,204,047 B2
(45) Date of Patent: Dec. 1, 2015

(54) IMAGING

(75) Inventor: Juha Heikki Alakarhu, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 982 days.

(21) Appl. No.: 13/082,863

(22) Filed: Apr. 8, 2011

(65) Prior Publication Data

US 2012/0257069 A1    Oct. 11, 2012

(51) Int. Cl.
*H04N 5/232*     (2006.01)
*H04N 5/378*     (2011.01)
*H04N 5/374*     (2011.01)

(52) U.S. Cl.
CPC ....... *H04N 5/23258* (2013.01); *H04N 5/23287* (2013.01); *H04N 5/374* (2013.01); *H04N 5/378* (2013.01)

(58) Field of Classification Search
USPC .......................................... 348/208.4, 208.99
See application file for complete search history.

(56) References Cited

U.S. PATENT DOCUMENTS

| | | | | |
|---|---|---|---|---|
| 3,572,939 | A | 3/1971 | Burdick | 356/124 |
| 6,801,717 | B1 * | 10/2004 | Hofer | 396/121 |
| 7,248,294 | B2 * | 7/2007 | Slatter | 348/240.99 |
| 7,664,384 | B2 * | 2/2010 | Hope | 396/103 |
| 8,493,454 | B1 * | 7/2013 | Kohn et al. | 348/208.6 |
| 2005/0057662 | A1 | 3/2005 | Washisu | 348/208.99 |
| 2005/0156915 | A1 | 7/2005 | Fisher et al. | 345/179 |
| 2006/0033966 | A1 | 2/2006 | Yamamoto et al. | 358/474 |
| 2006/0093237 | A1 | 5/2006 | Jacobsen et al. | 382/275 |
| 2006/0125926 | A1 * | 6/2006 | Nishino | 348/208.13 |
| 2007/0183765 | A1 * | 8/2007 | Imamura | 396/55 |
| 2008/0111889 | A1 | 5/2008 | Fujita et al. | 348/208.5 |
| 2009/0096913 | A1 | 4/2009 | Wang et al. | 348/345 |
| 2009/0256947 | A1 * | 10/2009 | Ciurea et al. | 348/333.12 |
| 2010/0020221 | A1 * | 1/2010 | Tupman et al. | 348/333.01 |
| 2010/0026819 | A1 | 2/2010 | Koh | 348/208.4 |
| 2011/0267531 | A1 * | 11/2011 | Imai | 348/333.12 |
| 2011/0292242 | A1 * | 12/2011 | Imai | 348/229.1 |

(Continued)

FOREIGN PATENT DOCUMENTS

CN    201159720    12/2008
EP    1 768 387 A1    3/2007

(Continued)

OTHER PUBLICATIONS http://beststuffformen.com/2010/05/26/top-rated-cameras-to-express-and-expand-your-photographic-creativity (2010), (29 pages).

*Primary Examiner* — Roberto Velez
*Assistant Examiner* — Tuan Le
(74) *Attorney, Agent, or Firm* — Harrington & Smith (57) ABSTRACT

A method, apparatus and computer program is provided. The apparatus includes at least one processor; and at least one memory storing a computer program including computer program instructions that, when executed by the at least one processor, cause at least the following to be performed: determining at least one area of interest in a scene imaged by an image sensor; initiating capture of a image, including the at least one area of interest, by causing the image sensor to be exposed to light conveyed by an optical arrangement; detecting movement of the apparatus during capture of the image; and controlling movement of at least one of: the image sensor and the optical arrangement, in dependence upon the detected movement of the apparatus and the at least one area of interest, in order to mitigate the perspective error, at the at least one area of interest, in the image being captured.

20 Claims, 6 Drawing Sheets

(56) References Cited

U.S. PATENT DOCUMENTS

2012/0050565 A1* 3/2012 Imai ............................ 348/224.1
2012/0069212 A1* 3/2012 Imai ............................ 348/223.1
2012/0069235 A1* 3/2012 Imai ......................... 348/333.11
2012/0133816 A1* 5/2012 Imai ......................... 348/333.03
2012/0213407 A1* 8/2012 Haikin et al. ................. 382/103

FOREIGN PATENT DOCUMENTS

| EP | 1 936 956 A2 | 6/2008 |
| JP | 2006215766 (A) | 8/2006 |
| WO | WO 2006/053411 A2 | 5/2006 |
| WO | WO 2007/045714 A1 | 4/2007 |

* cited by examiner

IMAGING

TECHNOLOGICAL FIELD

Embodiments of the present invention relate to imaging. In particular, they relate to mitigating perspective error in images.

BACKGROUND

If a camera and its digital image sensor move during exposure (for example, due to user handshake) perspective error may occur. Perspective error occurs because, when the digital image sensor moves, its perspective of a scene changes.

For example, user handshake may cause the orientation of the digital image sensor to change relative to the scene being imaged, causing perspective error. The perspective error may cause items in a captured image to have blurred edges.

BRIEF SUMMARY

According to various, but not necessarily all, embodiments of the invention there is provided an apparatus, comprising: at least one processor; and at least one memory storing a computer program comprising computer program instructions that, when executed by the at least one processor, cause at least the following to be performed: determining at least one area of interest in a scene imaged by an image sensor; initiating capture of a image, including the at least one area of interest, by causing the image sensor to be exposed to light conveyed by an optical arrangement; detecting movement of the apparatus during capture of the image; and controlling movement of at least one of: the image sensor and the optical arrangement, in dependence upon the detected movement of the apparatus and the at least one area of interest, in order to mitigate the perspective error, at the at least one area of interest, in the image being captured.

According to various, but not necessarily all, embodiments of the invention there is provided a method, comprising: determining at least one area of interest in a scene imaged by an image sensor of an apparatus; initiating capture of a image, including the at least one area of interest, by causing the image sensor to be exposed to light conveyed by an optical arrangement; detecting movement of the apparatus during capture of the image; and controlling movement of at least one of: the image sensor and the optical arrangement, in dependence upon the detected shake and the at least one area of interest, in order to mitigate the perspective error, at the at least one area of interest, in the image being captured.

According to various, but not necessarily all, embodiments of the invention there is provided a computer program comprising computer program instructions that, when executed by at least one processor, cause the method described above to be performed.

According to various, but not necessarily all, embodiments of the invention there is provided a non-transitory computer readable medium storing a computer program comprising computer program instructions that, when executed by at least one processor, cause at least the following to be performed: determining at least one area of interest in a scene imaged by an image sensor of an apparatus; initiating capture of a image, including the at least one area of interest, by causing the image sensor to be exposed to light conveyed by an optical arrangement; detecting movement of the apparatus during capture of the image; and controlling movement of at least one of: the image sensor and the optical arrangement, in dependence upon the detected shake and the at least one area of interest, in order to mitigate the perspective error, at the at least one area of interest, in the image being captured.

According to various, but not necessarily all, embodiments of the invention there is provided an apparatus, comprising: means for determining at least one area of interest in a scene imaged by an image sensor; means for initiating capture of a image, including the at least one area of interest, by causing the image sensor to be exposed to light conveyed by an optical arrangement; means for detecting movement of the apparatus during capture of the image; and means for controlling movement of at least one of: the image sensor and the optical arrangement, in dependence upon the detected movement of the apparatus and the at least one area of interest, in order to mitigate the perspective error, at the at least one area of interest, in the image being captured.

BRIEF DESCRIPTION

For a better understanding of various examples of embodiments of the present invention reference will now be made by way of example only to the accompanying drawings in which.

DETAILED DESCRIPTION

Embodiments of the invention relate to mitigating perspective error in a still image.

The figures illustrate an apparatus 10/20, comprising: at least one processor 12; and at least one memory 14 storing a computer program 16 comprising computer program instructions 18 that, when executed by the at least one processor 12, cause at least the following to be performed: determining at least one area of interest 74 in a scene 70 imaged by an image sensor 22; initiating capture of a image, including the at least one area of interest 74, by causing the image sensor 22 to be exposed to light conveyed by an optical arrangement 24; detecting movement of the apparatus 10/20 during capture of the image; and controlling movement of at least one of: the image sensor 22 and the optical arrangement 24, in dependence upon the detected movement of the apparatus 10/20 and the at least one area of interest 74, in order to mitigate the perspective error, at the at least one area of interest 74, in the image being captured.

Figure 1:
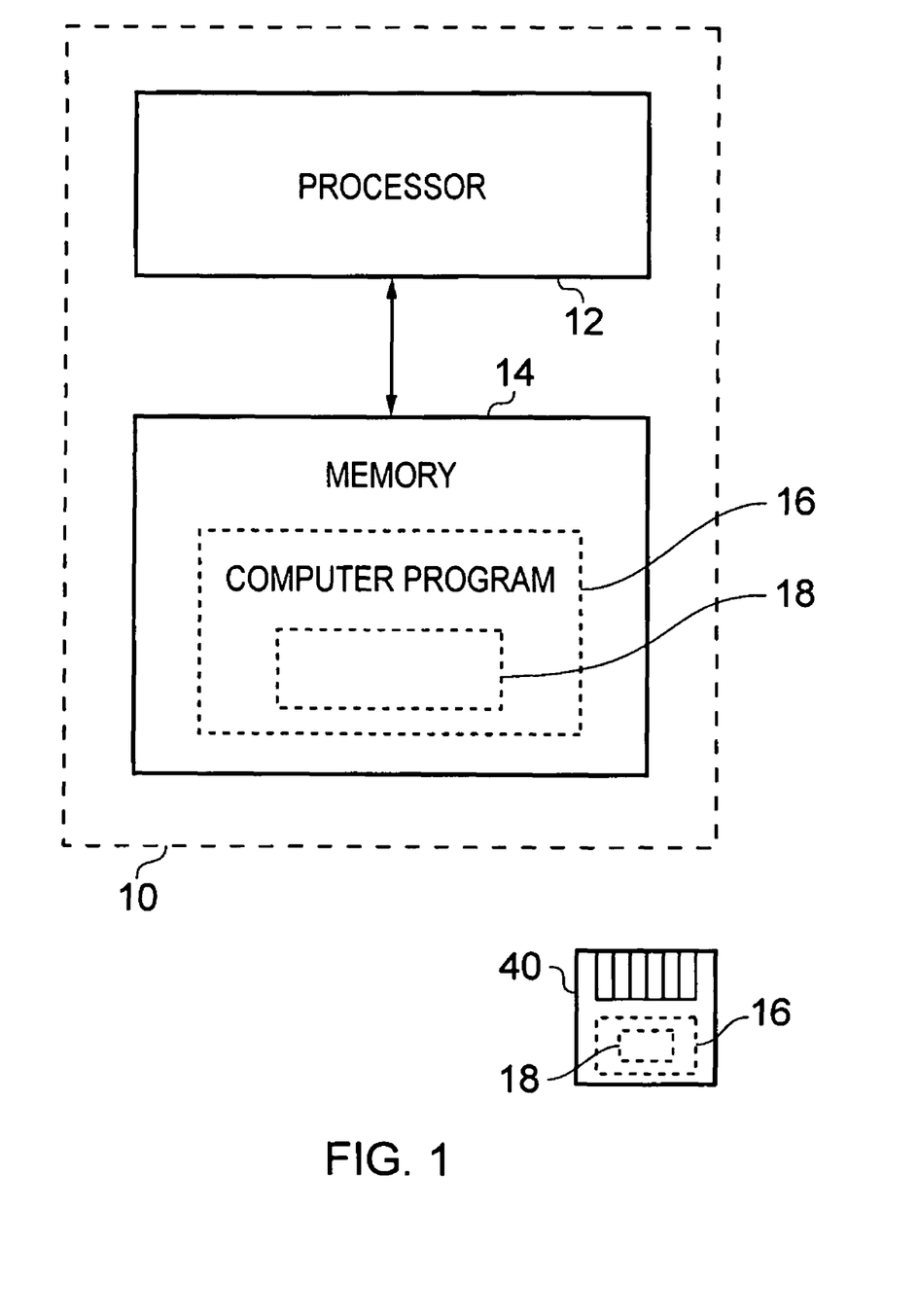
FIG. 1 illustrates an apparatus such as a chipset.

FIG. 1 illustrates an apparatus 10. The apparatus 10 may, for example, be a chipset. The apparatus 10 comprises at least one processor 12 and at least one memory 14. A single processor 12 is illustrated schematically in FIG. 1. In practice, the apparatus 10 may comprise more than one processor.

The processor 12 is configured to read from and write to the memory 14. The processor 12 may also comprise an output interface via which data and/or commands are output by the processor 12 and an input interface via which data and/or commands are input to the processor 12.

The memory 14 stores a computer program 16 comprising computer program instructions 18 that control the operation of the apparatus 10/20 when loaded into the processor 12. The computer program instructions 18 provide the logic and routines that enables the apparatus 10/20 to perform the methods illustrated in FIG. 3. The processor 12 by reading the memory 14 is able to load and execute the computer program instructions 18.

The computer program 16 may arrive at the apparatus 10/20 via any suitable delivery mechanism 40. The delivery mechanism 40 may be, for example, a non-transitory computer-readable storage medium, a computer program product, a memory device, a record medium such as a compact disc read-only memory (CD-ROM) or digital versatile disc (DVD), and/or an article of manufacture that tangibly embodies the computer program 16. The delivery mechanism 40 may be a signal configured to reliably transfer the computer program 16.

Although the memory 14 is illustrated as a single component it may be implemented as one or more separate components some or all of which may be integrated/removable and/or may provide permanent/semi-permanent/dynamic/cached storage.

Figure 2:
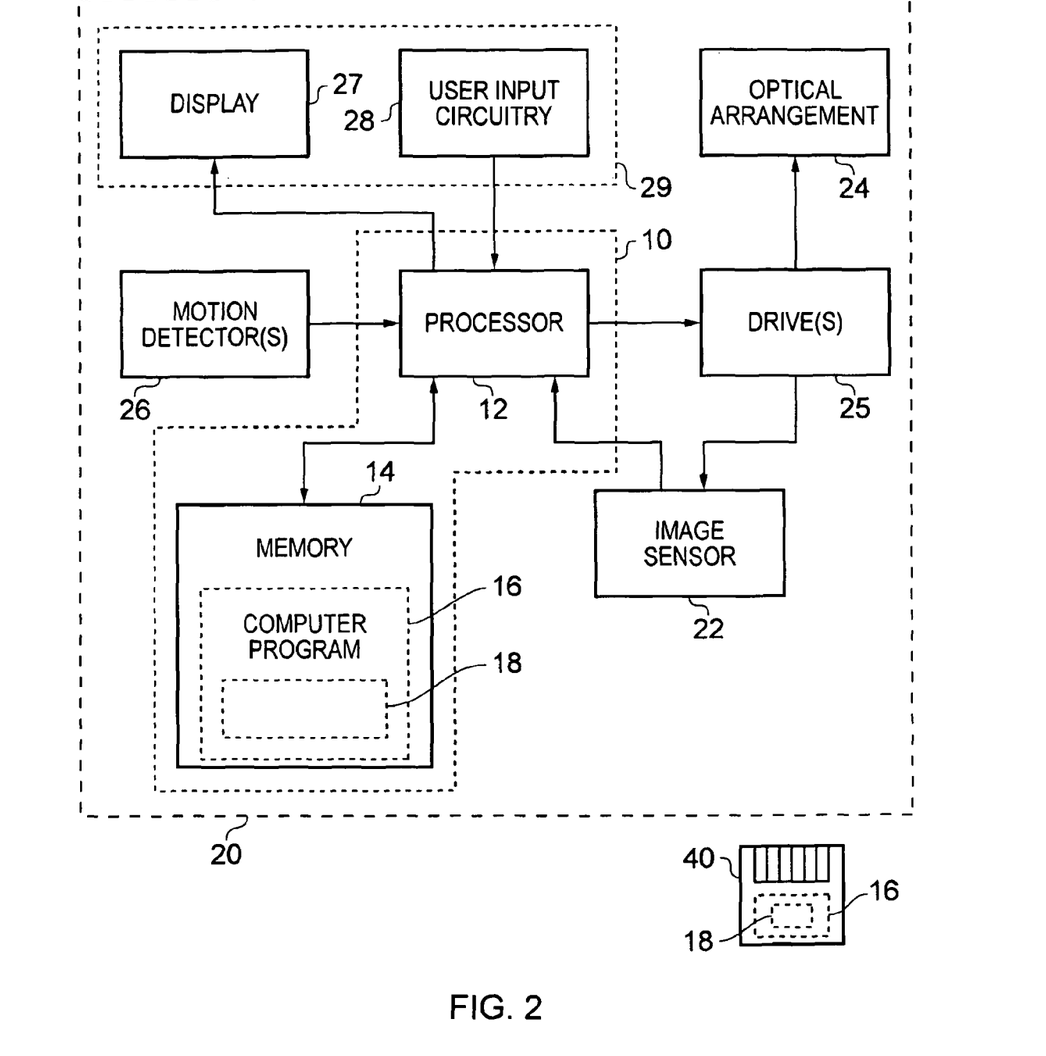
FIG. 2 illustrates an apparatus such as a digital camera.

FIG. 2 illustrates an apparatus 20. The apparatus 20 may, for example, be a digital camera. In some embodiments of the invention, the digital camera may have mobile telephone functionality.

The apparatus 20 illustrated in FIG. 2 comprises: an image sensor 22, an optical arrangement 24, one or more drives 25, one or more motion detectors 26, a display 27, user input circuitry 28 and the apparatus 10 illustrated in FIG. 1.

The elements 12, 14, 22, 24, 25, 26, 27 and 28 are operationally coupled and any number or combination of intervening elements can exist (including no intervening elements). The elements 12, 14, 22, 24, 25, 26, 27, 28 may, for example, be co-located within a housing.

The image sensor 22 may, for example, be a digital image sensor such as a charge-coupled device (CCD) or a complementary metal-oxide-semiconductor (CMOS). The processor 12 is configured to receive inputs from the image sensor 22. For example, the processor 12 may retrieve image data (for instance, in the form of a still image or a video image) from the image sensor 22 and store it in the memory 14.

The optical arrangement 24 may, for example, include one or more optical devices such as one or more lenses. The optical arrangement 24 is configured to receive light from a scene, external to the apparatus 20, through an aperture in the apparatus 20. The optical arrangement 24 is configured to convey that light to the image sensor 22 (for example, for capture of a still image).

The one or more drives 25 may, for example, comprise one or more electric motors. The processor 12 is configured to provide control signals to the drive(s) 25, in order to control movement of the optical arrangement 24 and/or the image sensor 22. If the optical arrangement 24 comprises one or more optical devices, the processor 12 may be configured to control movement of the optical arrangement 24 by controlling movement of some or all of those optical devices.

The one or more motion detectors 26 may, for example, comprise one or more accelerometers and/or a gyroscope. The processor 12 is configured to receive inputs from the one or more motion detectors 26 in order to detect motion of the apparatus 10 and to determine the direction and magnitude of that motion.

The processor 12 is configured to control the display 27. The display 27 may, for example, display images, graphical items and text. It comprises a plurality of pixels and may, for example, be a liquid crystal display (LCD) or an organic light emitting display (OLED).

The processor 12 is configured to receive inputs from the user input circuitry 28. The user input circuitry 28 may, for example, comprise one or more switches corresponding with one or more keys. In some embodiments of the invention, at least some of the user input circuitry 28 may be integrated with the display 27 in a touch sensitive display 29. The touch sensitive display 29 may be any type of touch sensitive display. For example, it may include capacitive, resistive and/or acoustic wave technology.

The processor 12 may be configured to control the display 27 to display a menu system that enables the user to access the functions of the apparatus 20. A user may navigate the menu system by providing inputs at the user input circuitry 28 which are interpreted by the processor 12.

A method according to embodiments of the invention will now be described in relation to the flow chart illustrated in FIG. 3.

A user 60 navigates a menu system of the apparatus 20 and provides one or more inputs, via the user input circuitry 28, to access an image capture mode of the apparatus 20. In this example, when the apparatus 20 enters the image capture mode, light enters the apparatus 20 via an aperture in its housing. The light is conveyed to the image sensor 22 by the optical arrangement 24. The processor 12 retrieves video image data from the image sensor 22 and uses it to display a real-time video image on the display 27. When the apparatus 20 is in the image capture mode, the real-time video image displayed on the display 27 changes as the position and orientation of the apparatus 20 is altered by the user 60.

Figure 4A:
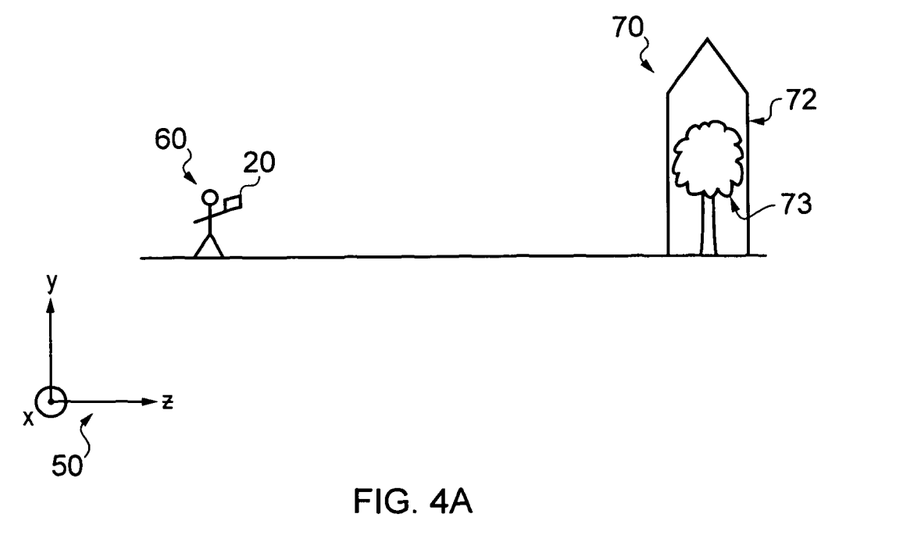
FIG. 4A illustrates a user capturing a still image of a scene.

In this example, the user 60 directs the aperture of the apparatus 20 towards a particular scene 70. This is illustrated in FIG. 4A. The processor 12 retrieves the real-time video image data, including the scene 70, from the image sensor 22. The processor 12 controls the display 27 to display the scene 70 being imaged by the image sensor 22. The scene 70 illustrated in FIG. 4A includes a house 72 and a tree 73.

Cartesian co-ordinate axes 50 are illustrated in FIG. 4A. The y and z axes are parallel with the plane of the page and the x axis extends out from the page. The co-ordinate axes 50 are present in FIGS. 4A to 6 to indicate the orientation of these figures relative to one another.

Figure 4B:
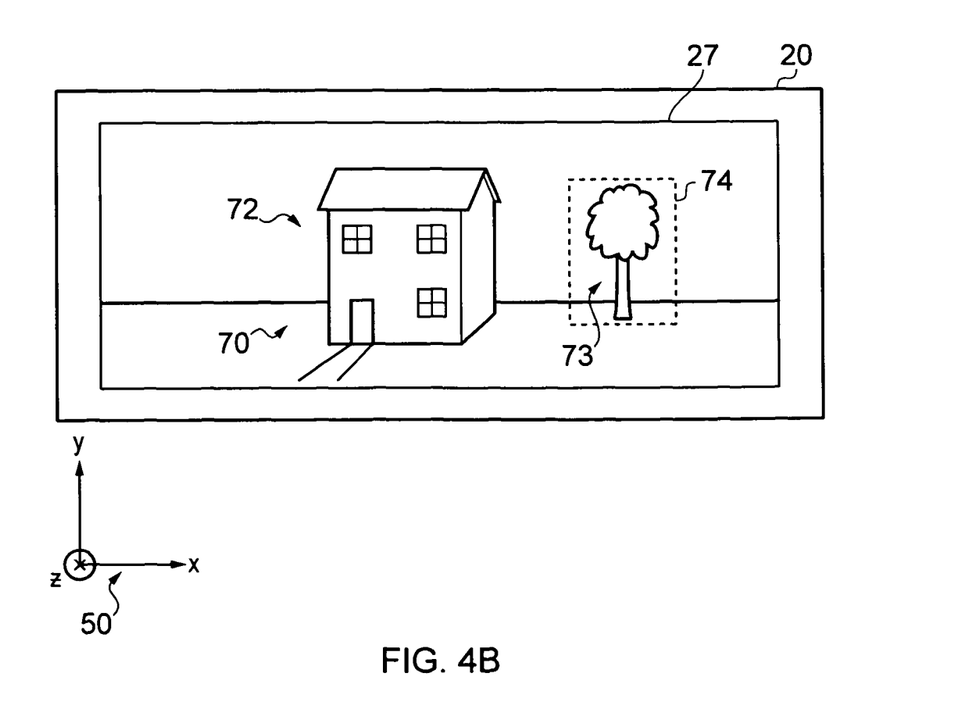
FIG. 4B illustrates an apparatus displaying a scene for still image capture.

FIG. 4B illustrates the scene 70 displayed on the display 27 of the apparatus 20. In FIG. 4B, the x and y axes are parallel with the plane of the page and the z axis is extends into the page.

Figure 3:
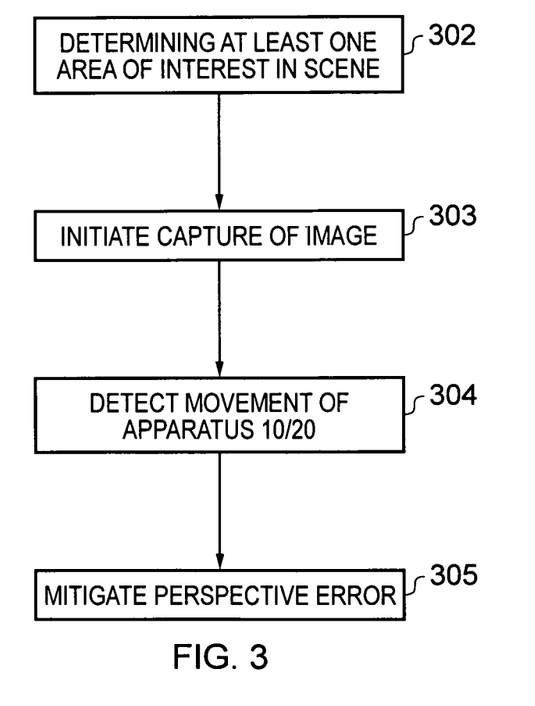
FIG. 3 illustrates a flow chart of a method.

At block 302 in FIG. 3, the processor 12 determines which region (or regions) of the scene 70 represent an area (or areas) of interest. In some embodiments of the invention, the user 60 may provide user input via the user input circuitry 28 to designate one or more regions as areas of interest in the scene 70. For instance, if the apparatus 20 comprises a touch sensitive display 29, the user may designate an area of interest by touching the display 29 at the area of interest in the displayed scene 70.

In some embodiments of the invention, it may not be necessary for the user 60 to provide user input to designate an area of interest. The processor 12 may designate an area of interest automatically. For instance, the processor 12 may perform image processing to determine whether a human face is present and, if so, the processor 12 may designate the human face as an area of interest.

The processor 12 may process the displayed scene 70 to demarcate different regions in the scene using image processing. Different elements in a scene 70 may be demarcated as different regions. For example, the scene 70 illustrated in FIG. 4B may be demarcated such that the house 72 is in a different region to the tree 73. Therefore, if the user 60 touches a region (for example, the tree 73) to designate it as an area of interest, other regions (for example, the house 72) are not designated as areas of interest unless further user input is provided in respect of those regions. This means that different elements in a scene 70 are treated as different regions for the purpose of designating areas of interest.

In this example the user provides input and the processor 12 determines, from the user input, that an area of interest in the scene 70 is the tree 73. The area of interest is indicated by the dotted line 74 in FIG. 4B. In some embodiments of the invention, after the processor 12 has determined the area of interest, it may control the display 27 to identify the determined area of interest to the user 60. For instance, the area of interest 74 may be highlighted on the display 27 by the processor 12.

In this example, the processor 12 also responds to determination of the area of interest 74 by controlling the drive(s) 25 to move the optical arrangement 24 and/or the image sensor 22 to place the area of interest 74 into focus. For example, the area of interest 74 may be in focus and other areas may be out of focus.

The user 60 then provides user input, at the user input circuitry 28, to cause the apparatus 20 to capture a still image. In response to the user input, at block 303 of FIG. 3, the processor 12 initiates the capture of a still image including the area of interest 74. For example, the processor 12 may reset the image sensor 22 and then cause the image sensor 22 to be exposed to light emanating from the scene 70 and conveyed to the image sensor 22 by the optical arrangement 24.

The apparatus 22 may move while the still image is being captured (and the image sensor 22 is being exposed). For example, the apparatus 20 may shake (move irregularly) while the still image is being captured, because an external force is applied to the apparatus 20. If the apparatus 20 is held in the user's hand(s) while the still image is being captured, the external force may be provided by user handshake. Alternatively, if the apparatus 20 is positioned on a tripod while the still image is being captured, the external force may be provided by wind.

Movement of the apparatus 20 will cause the image sensor 22 to move, altering the scene 70 being imaged at the image sensor 22 and changing the position of imaged items 72, 73 at the image sensor 22. Furthermore, since the image sensor's perspective of the scene 70 changes when the apparatus 20 moves, the shape of each item 72, 73 being imaged also changes. For example, with regard to the scene 70 illustrated in FIG. 4B, the shape of the house 72 and the shape of the tree 73 will change.

At block 304 in FIG. 3, the processor 12 receives an input from the motion detector(s) 26 during image capture. It detects, from that input, that the apparatus 20 is moving.

At block 305 in FIG. 3, the processor 12 controls movement of at least one of the image sensor 22 and the optical arrangement 24, in dependence upon the detected movement of the apparatus 20 and the area(s) of interest 74, in order to mitigate the perspective error, at the area(s) of interest 74, in the still image being captured.

Figure 5:
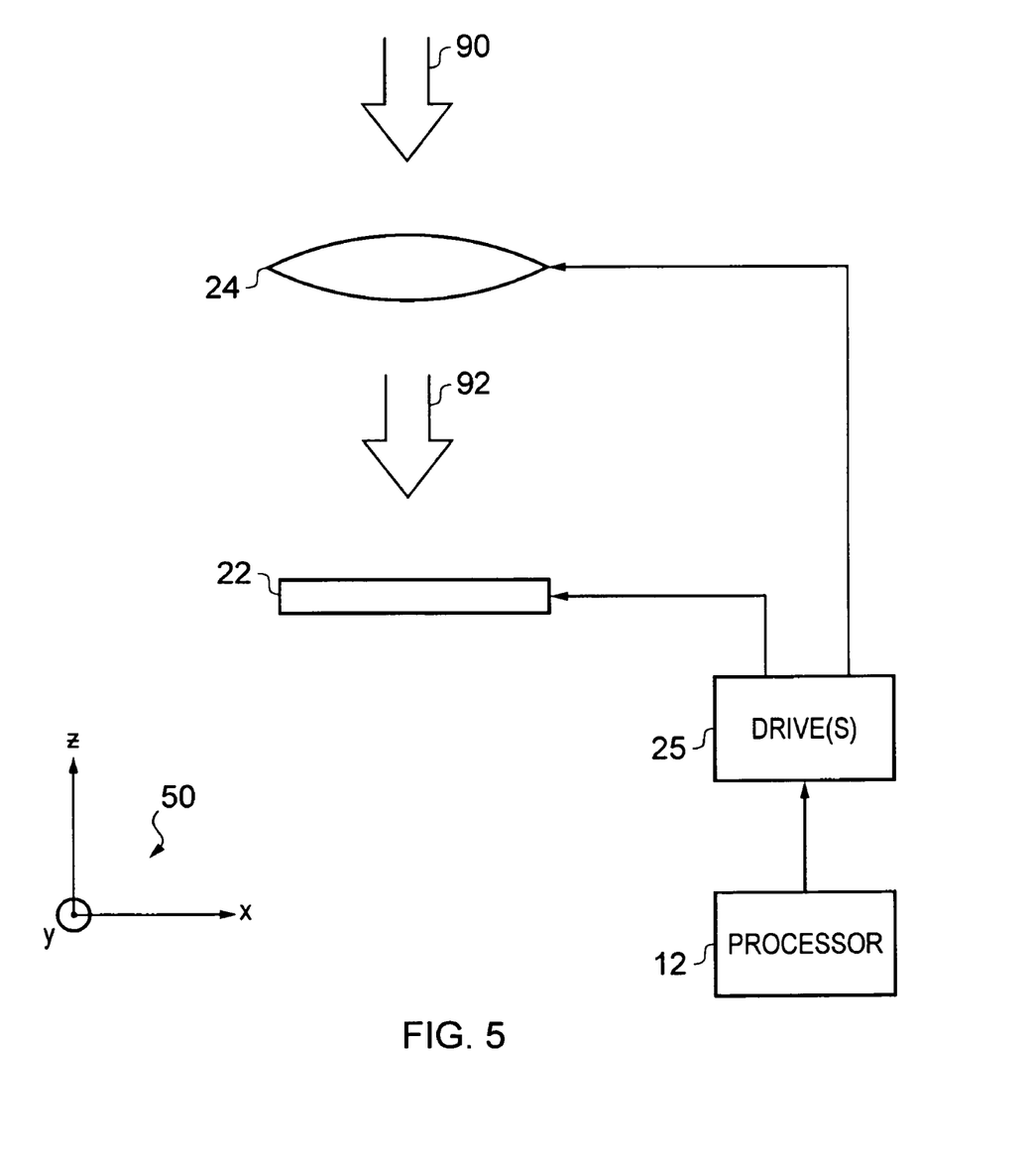
FIG. 5 schematically illustrates controlling movement of an image sensor and/or an optical arrangement during still image capture.

FIG. 5 illustrates a schematic including the image sensor 22 and the optical arrangement 24. The arrow designated with the reference numeral 90 illustrates light emanating from the scene 70. The arrow designated with the reference numeral 92 illustrates light being conveyed from the optical arrangement 24 to the image sensor 22. The processor 12 compensates for the movement of the apparatus 20 by causing the image sensor 22 and/or the optical arrangement 24 to move. In this example, the image sensor 22 and/or the optical arrangement 24 are configured to move in a translational sense relative to one another, but not in a rotational sense. That is, the image sensor 22 and/or the optical arrangement 24 is/are configured to move in at least one of: the +/−x-directions, the +/−y-directions and the +/−z-directions. Preferably, at least one of the image sensor 22 and the optical arrangement 24 is configured to move in at least the +/−x-directions and the +/−y-directions.

In this example, the image sensor 22 cannot be tilted/rotated relative to the optical arrangement 24, nor can the optical arrangement 24 be tilted/rotated relative to the image sensor 22.

When the apparatus 20 moves during still image capture (for example, due to user handshake), the processor 12 uses the drive(s) 25 to move the image sensor 22 and/or the optical arrangement 24 to compensate for the movement of the apparatus 20, so the scene 70 being imaged by the image sensor 22 remains substantially constant at the image sensor 22 (that is, the items 72, 73 being imaged stay in substantially the same place at the image sensor 22). This mitigates blurring in the resultant still image.

The processor 12 also uses the drive(s) 25 to move the image sensor 22 and/or the optical arrangement 24 to mitigate the perspective error in the image being captured. This further mitigates blurring in the resultant still image.

Figure 6:
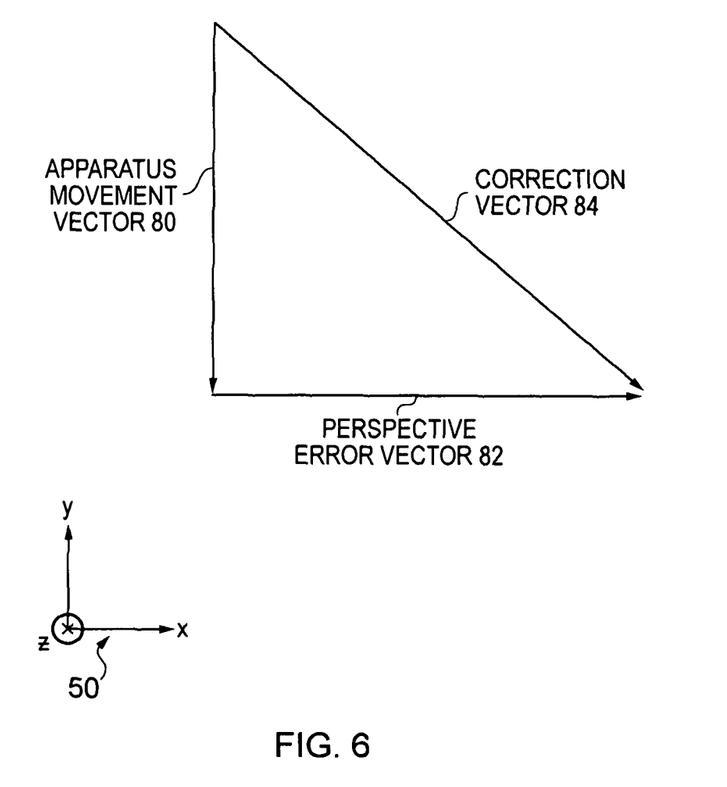
FIG. 6 schematically illustrates how a correction vector is determined.

The processor 12 may control the image sensor 22 and/or the optical arrangement 24 to move in accordance with a determined correction vector. FIG. 6 illustrates an example of how the correction vector 84 may be determined.

In order to determine the correction vector 84, the processor 12 may, for instance, monitor the movement of the apparatus 20 (and therefore the image sensor 22) over discrete periods of time.

In this example, over a particular discrete period of time the apparatus 20 moves in the +y direction causing the items 72, 73 in the displayed scene 70 to move in the −y direction. The processor 12 determines that translational movement of the image sensor 22 and/or the optical arrangement 24 in the −y direction will compensate for the movement of the apparatus 20 (such that the positions of the items 72, 73 in the scene 70 remain substantially constant at the image sensor 22). The translational movement vector determined by the processor 12 to compensate for this is illustrated as the "apparatus movement vector 80" illustrated in FIG. 6.

The processor 12 also determines that translational movement of the image sensor 22 and/or the optical arrangement 24 in the +x direction will mitigate the perspective error that would occur at the area of interest 74 due to the movement of the apparatus 20 during still image capture. The translational movement vector determined by the processor 12 to compensate for the perspective error is illustrated as the "perspective error vector 82" in FIG. 6. The direction and magnitude of the perspective error vector 82 depends upon the position of the area of interest 74 in the scene 70 being imaged and the direction and magnitude of movement of the apparatus 20 over the discrete period of time.

In this example, the movement of the image sensor 22 and/or the optical arrangement 24 caused by the processor 12 may result in perspective error being mitigated at the area of interest, but not in other regions of the still image. It will be appreciated by those skilled in the art that movement of the image sensor 22 and/or the optical arrangement 24 to mitigate the perspective error at an area of interest 74 may introduce perspective error in other parts of the still image that are of less interest to the user 60. Mitigation of the perspective error at the area(s) of interest therefore causes the area(s) of interest in the still image to appear sharper than it/they otherwise would, but also causes other areas in the still image to appear to be more blurred than they otherwise would.

The correction vector 84 illustrated in FIG. 6 indicates how the image sensor 22 and/or the optical arrangement 24 is/are moved to compensate for movement of the apparatus 20, and is the sum of the apparatus movement vector 80 and the perspective error vector 82.

The processor 12 monitors the movement of the apparatus 20 over discrete periods of time and controls the image sensor 22 and/or the optical arrangement 24 to move as described above. In practice the discrete time periods may be very short, such that the image sensor 22 and/or the optical arrangement 24 appear(s) to be continually moving.

In some embodiments of the invention, as explained above, the user 60 may designate more than one area of interest. In these embodiments, the processor 12 may control the image sensor 22 and/or the optical arrangement 24 so that the perspective error in the areas of interest is, to some extent, reduced/mitigated.

In some implementations, the extent to which the perspective error is mitigated in each area of interest may be the same. In other implementations, the processor 12 may prioritize a particular area of interest (or particular areas of interest) above others and mitigate the perspective error in higher priority areas to a greater extent than in the others. For example, an area of interest comprising a human face may be prioritized over other areas of interest that do not comprise a human face. Larger human faces in the image being captured (that is, those closest to the image sensor 22) may be prioritized over smaller human faces. Alternatively or additionally, the processor 12 may use image recognition techniques to recognize human faces, and may prioritize recognized human faces over non-recognized human faces.

Embodiments of the invention as described above provide a method of mitigating the perspective error in an area of interest of a still image. Advantageously, in embodiments of the invention, it is not necessary to rotate/tilt the image sensor 22 or the optical arrangement 24. This enables the apparatus 20 to have a relatively small thickness.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The blocks illustrated in FIG. 3 may represent steps in a method and/or sections of code in the computer program 16. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For example, the apparatus 20 may further comprise position sensors that are configured to verify the position of image sensor 22 and/or the optical arrangement 24 and provide an appropriate input to the processor 12.

Embodiments of the invention are described above in the context of the capture of a still image. In other embodiments of the invention, a video image may be captured rather than a still image. The perspective error in at least one area of interest of the video image may be mitigated using the techniques described above.

In some embodiments of the invention, it is not necessary for the apparatus 20 to comprise a display 27.

In some alternative examples to those described above, the user 60 may provide input to designate the area(s) of interest in a different manner from that described above. In some of those examples, the user input circuitry 28 may comprise a shutter key. The user may partially depress the shutter key to designate an area of interest (for instance, in the center of the scene 70 displayed on the display 27). The user 60 may then re-adjust the position and/or orientation of the camera aperture, if desired, to capture a still image. The area of interest following this re-adjustment may or may not be in the center of the captured still image.

In these alternative examples, the processor 12 may maintain the designated area of interest as the camera aperture moves by tracking an element in the designated area of interest as it moves across the image sensor 22/displayed scene 70. Alternatively or additionally, the processor 12 may use inputs provided by the motion detector(s) 26 to track an area of interest.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus, comprising:
   at least one processor; and
   at least one memory storing a computer program comprising computer program instructions that, when executed by the at least one processor, cause at least the following to be performed:
   determining at least one area of interest in a scene imaged by an image sensor;
   initiating capture of an image, including the at least one area of interest, by causing the image sensor to be exposed to light conveyed by an optical arrangement;
   detecting movement of the apparatus during capture of the image; and
   controlling a compensating movement of at least one of the image sensor and the optical arrangement in dependence upon the detected movement of the apparatus and the at least one area of interest, in order to mitigate a perspective error caused by the detected movement, at the at least one area of interest in the image being captured, wherein the compensating movement is controlled in dependence on a sum of a determined direction and a magnitude of a change of position over a discrete period of time of an x direction vector and a y direction vector of the at least one area of interest caused by the detected movement, and wherein the determined direction and magnitude of the change over the discrete period of time of the x direction vector and the y direction vector depends on an initial position of the at least one area of interest before the detected movement.

2. An apparatus as claimed in claim 1, wherein the compensating movement comprises movement of the at least one of the image sensor and the optical arrangement of the apparatus that is controlled so that at least a position of the at least one area of interest in the image being captured remains constant at the image sensor of the apparatus during the detected movement.

3. An apparatus as claimed in claim 2, wherein the compensating movement of the at least one of the image sensor and the optical arrangement of the apparatus is further controlled so that at least a shape of the at least one area of interest in the image being captured remains constant at the image sensor of the apparatus during the detected movement.

4. An apparatus as claimed in claim 1, wherein the at least one area of interest comprises more than one area of interest, and wherein the compensating movement is controlled in dependence on a sum of a determined direction and magnitude of a change of position over a discrete period of time of an x direction vector and a y direction vector of the more than one area of interest at the image sensor of the apparatus caused by the detected movement.

5. An apparatus as claimed in claim 4, wherein the determined direction and magnitude of the change over the discrete period of time of the x direction vector and the y direction vector depends an initial position of the more than one area of interest before the detected movement.

6. An apparatus as claimed in claim 1, wherein the at least one area of interest in the scene is determined from user input and wherein the user input is user touch provided at a touch sensitive display.

7. An apparatus as claimed in claim 1, wherein the detecting the movement of the apparatus during the capture of the image, comprises detecting changes in a position and shape of the at least one area of interest from a perspective of the image sensor while the image is being captured.

8. An apparatus as claimed in claim 1, wherein the scene imaged by the image sensor is displayed on a display, and the at least one area of interest is at least one region of the scene displayed on the display.

9. An apparatus as claimed in claim 1, wherein a plurality of areas of interest is determined, and the compensating movement of the at least one of the image sensor and the optical arrangement is controlled so that at least a position of the plurality of areas of interest in the image being captured remains constant at the image sensor of the apparatus during the detected movement.

10. An apparatus as claimed in claim 1, wherein only a single area of interest is determined, and the compensating movement of at least one of: the image sensor and the optical arrangement is controlled so that at least a position of the single area of interest in the image being captured remains constant at the image sensor of the apparatus during the detected movement.

11. An apparatus as claimed in claim 1, wherein the image is a still image or a video image.

12. A method, comprising:
    determining at least one area of interest in a scene imaged by an image sensor of an apparatus;
    initiating capture of a image, including the at least one area of interest, by causing the image sensor to be exposed to light conveyed by an optical arrangement;
    detecting movement of the apparatus during capture of the image; and
    controlling a compensating movement of at least one of: the image sensor and the optical arrangement in dependence upon the detected movement of the apparatus and the at least one area of interest, in order to mitigate a perspective error caused by the detected movement, at the at least one area of interest in the image being captured, wherein the compensating movement is controlled in dependence on a sum of a determined direction and a magnitude of a change of position over a discrete period of time of an x direction vector and a y direction vector of the at least one area of interest caused by the detected movement, and wherein the determined direction and magnitude of the change over the discrete period of time of the x direction vector and the y direction vector depends on an initial position of the at least one area of interest before the detected movement.

13. A method as claimed in claim 12, wherein the at least one area of interest comprises more than one area of interest, and wherein the compensating movement is controlled in dependence on a sum of a determined direction and magnitude of change over a discrete period of time of an x direction vector and a y direction vector of the more than one area of interest at the image sensor caused by the detected movement during the detected movement.

14. A method as claimed in claim 12, wherein the compensating movement comprises movement of the at least one of the image sensor and the optical arrangement that is controlled in dependence upon at least a position of the at least one area of interest in the image being captured remaining constant at the image sensor.

15. A method as claimed in claim 12, wherein the at least one area of interest in the scene is determined from user input.

16. A method as claimed in claim 12, wherein the detecting the movement of the apparatus during the capture of the image, comprises detecting changes in a position and shape of the at least one area of interest from a perspective of the image sensor while the image is being captured.

17. A method as claimed in claim 12, wherein the scene imaged by the image sensor is displayed on the display, and the at least one area of interest is at least one region of the scene displayed on the display.

18. A non-transitory computer readable medium storing a computer program comprising computer program instructions that, when executed by at least one processor, cause at least the following to be performed:
   determining at least one area of interest in a scene imaged by an image sensor of an apparatus;
   initiating capture of a image, including the at least one area of interest, by causing the image sensor to be exposed to light conveyed by an optical arrangement;
   detecting movement of the apparatus during capture of the image; and
   controlling a compensating movement of at least one of: the image sensor and the optical arrangement in dependence upon the detected movement of the apparatus and the at least one area of interest, in order to mitigate a perspective error caused by the detected movement, at the at least one area of interest in the image being captured, wherein the compensating movement is controlled in dependence on a sum of a determined direction and a magnitude of a change of position over a discrete period of time of an x direction vector and a y direction vector of the at least one area of interest caused by the detected movement, and wherein the determined direction and magnitude of the change over the discrete period of time of the x direction vector and the y direction vector depends on an initial position of the at least one area of interest before the detected movement.

19. A non-transitory computer readable medium as claimed in claim 18, wherein the compensating movement comprises movement of the at least one of the image sensor and the optical arrangement is controlled so that at least a position of the at least one area of interest in the image being captured remains constant at the image sensor during the detected movement.

20. A non-transitory computer readable medium as claimed in claim 18, wherein the detecting the movement of the apparatus during the capture of the image, comprises detecting changes in a position and shape of the at least one area of interest from a perspective of the image sensor while the image is being captured.

\* \* \* \* \*